United States Patent
Gordon et al.

[11] Patent Number: 6,153,233
[45] Date of Patent: *Nov. 28, 2000

[54] FOOD ITEM AND ITS FABRICATING METHODS

[75] Inventors: Daniel L. Gordon, Plymouth; Paul D. Nordling, Champlin; Soumya Roy, Plymouth, all of Minn.

[73] Assignee: General Mills, Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/132,721

[22] Filed: Aug. 12, 1998

[51] Int. Cl.$^7$ .................................................. A23G 3/20
[52] U.S. Cl. ........................ 426/90; 426/72; 426/74; 426/103; 426/104; 426/132; 426/289; 426/292; 426/302; 426/305; 426/420; 426/512
[58] Field of Search ................... 426/72, 73, 74, 426/103, 104, 132, 289, 292, 420, 517, 90, 302, 305

[56] References Cited

U.S. PATENT DOCUMENTS

| | | | |
|---|---|---|---|
| D. 218,726 | 9/1970 | La Mothe et al. | D1/120 |
| D. 234,099 | 1/1975 | Gobble | D1/120 |
| D. 247,071 | 1/1978 | Neidenberg et al. | D1/120 |
| D. 252,536 | 8/1979 | Goglanian | D1/129 |
| D. 283,748 | 5/1986 | Duty | D1/106 |
| D. 358,699 | 5/1995 | Benham et al. | D1/125 |
| D. 358,962 | 6/1995 | Benham | D1/125 |
| D. 360,969 | 8/1995 | Uecker et al. | D1/125 |
| D. 373,231 | 9/1996 | Gluszak et al. | D1/125 |
| D. 373,232 | 9/1996 | Gluszak et al. | D1/125 |
| D. 373,233 | 9/1996 | Gluszak et al. | D1/125 |
| D. 374,969 | 10/1996 | Gluszak et al. | D1/125 |
| D. 375,183 | 11/1996 | Gluszak et al. | D1/125 |
| D. 375,395 | 11/1996 | Gluszak et al. | D1/102 |
| D. 376,037 | 12/1996 | Gluszak et al. | D1/102 |
| 1,241,374 | 9/1917 | Hammett | 426/292 |
| 1,778,479 | 10/1930 | Baier | 426/90 |
| 1,873,716 | 8/1932 | Nickerson | 426/420 X |
| 2,227,728 | 1/1941 | Lombi | 53/546 X |
| 2,600,222 | 6/1952 | Donofrio | 53/122 |
| 2,663,130 | 12/1953 | Donfrio | 53/122 |
| 2,700,939 | 2/1955 | Liston | 425/89 |
| 2,726,156 | 12/1955 | Armstrong | 426/410 X |
| 3,050,017 | 8/1962 | Mahler | 426/275 |
| 3,188,780 | 6/1965 | Mead | 53/122 |
| 3,218,776 | 11/1965 | Cloud | 53/453 |
| 3,225,717 | 12/1965 | Page | 426/501 |
| 3,410,699 | 11/1968 | Peters | 426/512 |
| 3,418,140 | 12/1968 | Fisher | 53/453 X |
| 3,669,007 | 6/1972 | Pulici | 99/450.6 |
| 3,869,845 | 3/1975 | Rodach et al. | 53/136.3 |

(List continued on next page.)

FOREIGN PATENT DOCUMENTS

| | | |
|---|---|---|
| 2323262 | 9/1998 | United Kingdom . |
| 96/08971 | 3/1996 | WIPO . |
| 98 20752 | 5/1998 | WIPO . |

OTHER PUBLICATIONS

Thos. Mills & Bros., Inc., pp. 28 No. 152 Wafer.
Brochure titled "Fruit Roll–Ups" published by General Mills, Inc., Minneapolis, MN 55440. Jun. 1993.
The Confectioner—Sep./Oct. 1988 p. 18, Sweet Talk, Chewbonga® Rolls Out Sunline Brands.
Color copy of a sheet© 1988 Sunline Brands including the words "Chewbonga™ Super fruity, extra chewy candy roll."

*Primary Examiner*—Milton Cano
*Attorney, Agent, or Firm*—John A. O'Toole; Douglas J. Taylor; Alan D. Kamrath

[57] ABSTRACT

Topical applications are provided to the support material (16) before the deposit of the food (14) thereon or to the food (14) after the deposit of the food (14) on the support material (16). Thus, although the food (14) is continuously deposited on the support material (16), the characteristics of the food is varied by contact with the topical application. In the preferred form, the topical applications are in the form of flavors, colorants and/or fortification ingredients and especially temperature sensitive ingredients.

70 Claims, 2 Drawing Sheets

U.S. PATENT DOCUMENTS

| | | | |
|---|---|---|---|
| 3,871,155 | 3/1975 | Blaser | 53/453 X |
| 3,956,517 | 5/1976 | Curry et al. | 426/517 X |
| 4,076,207 | 2/1978 | Austin | 249/66.1 |
| 4,121,956 | 10/1978 | Sample | 426/383 |
| 4,205,951 | 6/1980 | Sollich | 426/517 X |
| 4,251,533 | 2/1981 | Kobayashi | 426/410 |
| 4,307,555 | 12/1981 | Mlodozeniec et al. | 53/546 X |
| 4,381,697 | 5/1983 | Crothers | 99/353 |
| 4,567,714 | 2/1986 | Chasman | 53/560 X |
| 4,571,924 | 2/1986 | Bahrani | 53/453 |
| 4,578,273 | 3/1986 | Krubert | 428/87 |
| 4,586,888 | 5/1986 | Anderson | 425/362 |
| 4,630,426 | 12/1986 | Gentry | 53/453 X |
| 4,847,098 | 7/1989 | Langler | 426/102 |
| 4,849,230 | 7/1989 | Varvello | 426/501 X |
| 4,850,087 | 7/1989 | Gronau | 242/67.1 R X |
| 4,853,236 | 8/1989 | Langler | 426/102 |
| 4,882,175 | 11/1989 | Ream et al. | 426/518 X |
| 4,894,978 | 1/1990 | Schonmann et al. | 53/580 |
| 4,992,284 | 2/1991 | Kunz . | |
| 4,999,206 | 3/1991 | Lortz | 426/512 |
| 5,012,728 | 5/1991 | Fehr et al. | 99/450.6 |
| 5,085,138 | 2/1992 | Fehr et al. | 99/450.6 |
| 5,146,730 | 9/1992 | Sadek et al. | 53/454 |
| 5,205,106 | 4/1993 | Zimmermann et al. | 53/122 X |
| 5,284,667 | 2/1994 | Zimmermann et al. | 426/420 |
| 5,297,947 | 3/1994 | Cardinali | 425/194 |
| 5,340,599 | 8/1994 | Maruyama et al. | 426/512 |
| 5,358,727 | 10/1994 | Yates et al. | 426/512 |
| 5,431,943 | 7/1995 | Sellmann | 426/512 |
| 5,455,053 | 10/1995 | Zimmermann et al. | 426/106 |
| 5,462,757 | 10/1995 | Booy et al. | 426/512 |
| 5,516,542 | 5/1996 | Zimmermann et al. | 426/420 |
| 5,536,517 | 7/1996 | Hannaford | 426/516 |
| 5,683,734 | 11/1997 | Israel | 426/496 |
| 5,723,163 | 3/1998 | Zimmermann et al. | 426/106 |
| 5,732,163 | 3/1998 | Zimmermann et al. | 426/106 |
| 5,752,364 | 5/1998 | Benham et al. | 426/512 X |
| 5,755,077 | 5/1998 | Benham et al. | 426/125 X |
| 5,780,091 | 7/1998 | Cassetta et al. | 426/557 |
| 5,840,354 | 11/1998 | Baumann et al. | 426/74 |
| 5,846,588 | 12/1998 | Zimmermann et al. | 426/420 |

FIG. 1

FOOD ITEM AND ITS FABRICATING METHODS

BACKGROUND

The present invention generally relates to apparatus and methods for fabricating food items, particularly to apparatus and methods for fabricating food items including food supported on support material, and more particularly to apparatus and methods for fabricating a coil of food supported on support material.

The sale of snack-type food products is a highly competitive business. In addition to the particular food components, increasingly the novelty and play value of the product are important in the marketability of any particular food item. For example, many foods such as dehydrated fruit puree are formed in a strip of a thinness generally requiring external support. One manner for increasing the novelty and play value of such foods is to roll the support material and the food supported thereon into a coil creating a novelty form of merchandizing for that food. Particularly, fruit-based snack products such as FRUIT ROLL-UPS™ fruit products have found wide market acceptance. Likewise, FRUIT-BY-THE-FOOT™ fruit-based snack products such as the type disclosed in U.S. Pat. Nos. 5,205,106; 5,284,667; 5,455,053 and 5,723,163 have similarly found wide market acceptance. Further, U.S. Pat. No. 4,882,175 recognized the enhanced marketability of chewing gum in the form of a rolled-up tape allowing the consumer the chance to break off the desired size of piece to chew, saving the rest for later.

Another manner for increasing the novelty and play value of such foods is to deposit the food onto the support material in a shape, with the support material retaining the shape of the food but with the food being peelable from the support material in a manner to increase the play value of the food item. Particularly, fruit-based snack products of the type disclosed in U.S. Pat. Nos. 5,752,364; 5,755,077; or 5,846,588 have found market acceptance.

In addition to the form of the food item, the characteristics of the food itself can add to the novelty and play value and thus the marketability of any particular food item. For example, in addition to the shape of the product, coloration and other visual factors can be utilized to affect the appearance of the food item. Similarly, variations in taste between different portions of the food in the particular food item will clearly have an impact on marketability of the food items. However, as the food is often desired to be fabricated as a single step for each particular food item, variations in characteristics of the food in any particular food item is difficult to fabricate, especially when such variations are desired to be consistent between food items.

Further, many foods are shaped and/or deposited on the support material at elevated temperatures. However, it is often desired that the particular food components include temperature sensitive ingredients such as but not limited to certain vitamins. It is then desired that such ingredients be topically applied separate from the formation and deposit of the food.

Accordingly, it is an object of the present invention to provide novel apparatus and methods for the fabrication of food items, which in the preferred form include a thin strip of food deposited on a strip of support material.

Another object of the present invention is to provide apparatus and methods where the characteristics of the food which is continuously being deposited on a web of support material is varied by contact with a topical application either on the support material before the deposit of the food or on the food itself after the deposit of the food. In most preferred forms, the topical application is in the form of a flavor which is different than the original flavor of the food deposited on the support material. Alternately or additionally, the topical application can include temperature sensitive ingredients or fortification ingredients which are desired to be added to the food after its formulation.

Yet another object of the present invention is to provide food items which are fabricated by such methods.

SUMMARY

Surprisingly, the above objectives can be satisfied in the field of food fabrication by providing, in the preferred form, methods of food fabrication where at least a first topical application is provided for contact by the food in a first portion of the area of the food so that the food characteristics in the first portion is the combination of the characteristics of the food and the topical application. In most preferred forms, the topical application is in the form of a first flavor which is different than the original flavor of the food deposited on the support material such that the resulting flavor of the food in the first portion is the combination of the original flavor of the food and the flavor of the topical application.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 2 shows a diagrammatic perspective view of an alternate apparatus utilizing food fabrication methods according to the preferred teachings of the present invention.

All figures are drawn for ease of explanation of the basic teachings of the present invention only; the extensions of the Figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "lower", "upper", "end", "axial", "longitudinal", "width", "height", and similar terms are used herein, it should be understood that these terms have reference only to the structure shown in the drawings as it would appear to a person viewing the drawings and are utilized only to facilitate describing the invention.

DESCRIPTION

Apparatus utilizing the present methods for fabricating a food item, especially a dehydrated fruit puree, on a continuous strip of support material, with the food and support material being rolled to produce the food item, according to the preferred teachings of the present invention is shown in the drawings and generally designated 10. In the most preferred embodiments of the present invention, apparatus 10 is an improvement of the type shown and described in U.S. Pat. Nos. 5,205,106; 5,284,667; 5,455,053 and 5,723,163. For purpose of explanation of the basic teachings of the present invention, the same numerals designate the same or similar parts in the present figures and the figures of U.S. Pat. Nos. 5,205,106; 5,284,667; 5,455,053 and 5,723,163. The description of the common numerals and apparatus 10 may be found herein and in U.S. Pat. Nos. 5,205,106; 5,284,667; 5,455,053 and 5,723,163, which are hereby incorporated herein by reference.

Referring to the drawings in detail, apparatus 10 includes a strip sheeter 12 for continuously forming a plurality of spaced, parallel, narrow strips of food 14 of a thinness requiring external support upon a continuous web or sheet of support material 16. In the preferred form where support material 16 and food 14 supported thereon are intended to be rolled into a coil to form a rolled food item, food 14 has a thickness of about 0.035 inch (0.89 mm) whereas when food 14 is intended to be held by support material 16 of a generally rigid material intended to support food 14 in a generally planar condition, food 14 can have greater thickness in the range of 0.125 to 0.25 inch (3 to 6 mm). In the preferred form, food 14 is formed of a base material, gelling agents (pectin, starch, carrageenan, etc.), and sweeteners (sucrose, corn derivatives, sugar alcohols or other low or no calorie sweeteners). Most preferably, food 14 is a sweetened dehyrated fruit-based material typically referred to in the art as a fruit leather which can be derived from fruit purees or juices and has a water activity ("$A_w$") of about 0.4 to about 0.7. Similarly, food 14 can be derived from vegetable-based materials. In the most preferred form, food 14 is of the same type as utilized in the first, solid or "hard" portion or region of the dual textured food piece described in U.S. Pat. No. 4,847,098 issued Jul. 11, 1989 to J. E. Langler and in U.S. Pat. No. 4,853,236 issued Aug. 1, 1989 to J. E. Langler, each entitled Dual Textured Food Piece of Enhanced Stability and each of which is hereby incorporated herein by reference.

Support material 16 may be formed of any suitable, nonedible material of a flexibility to passed through strip sheeter 12 and which has the necessary strength to support food 14 without tearing and which allows food 14 to be easily separated therefrom for consumption. In one preferred form, support material 16 is without bulkiness to allow rolling of food 14 and support material 16 into a compact food piece such as formed from silicon parchment paper. Where food 14 is intended to be supported in a generally planar condition, support material 16 can be formed of generally rigid material such as coated paperboard. However, support material 16 can be formed of other material according to the teachings of the present invention including but not limited to polymers such as cellophane, glasine or wax papers, or the like.

Strip sheeter 12 generally includes first and second press rollers 18 and 20. In the preferred form, roller 20 is heated by any suitable means, not shown, such as by steam, to a temperature corresponding to the initial temperature of food 14 and in the preferred form in the order of 170° F. (77° C.). The periphery of roller 18 is grooved and specifically includes a plurality of spaced, parallel, circular, circumferential bands or lands separating, forming and defining a plurality of spaced, parallel, annular depressions or grooves (not shown) around the periphery of roller 18. The spacing between the lands or in other words the width of the depressions or grooves is generally equal to the desired width of the strips of food 14 and the height of the lands or in other words the depth of the depressions or grooves is generally equal to the desired thickness of the strips of food 14. The width of the lands between depressions or grooves is generally equal to the desired spacing between the strips of food 14 which in the preferred form is in the order of one-eighth inch (one-third centimeter). The bottoms of the grooves are cylindrical in configuration and are relatively smooth. Roller 20 includes a cylindrical periphery 28 which is relatively smooth. Rollers 18 and 20 are rotatably mounted in an abutting relation, with periphery 28 of roller 20 engaging and rolling upon the lands of roller 18 along an abutment nip. In the most preferred form, rollers 18 and 20 are generally cylindrical and of equal diameters. Rollers 18 and 20 are rotated in opposite rotational directions to define an upper, mating side 32 and a lower, exit side 34. To allow cleaning, roller 20 may be slideably mounted relative to roller 18 to allow separation of roller 20 from roller 18.

Food 14 heated to a temperature to become flowable or pumpable is filled into upper mating side 32, with a containment bin or saddle 36 being provided complementary to and for holding food 14 above and evenly feeding material to and within mating side 32. In the preferred form, bin or saddle 36 includes first and second cross bars 38 extending axially across and engaging rollers 18 and 20, respectively. Bin 36 further includes end pieces 42 extending radially between and engaging the peripheries of rollers 18 and 20 and between cross bars 38. In the most preferred form, cross bars 38 extend generally parallel to and end pieces 42 extend generally perpendicular to the rotational axes of rollers 18 and 20. Food 14 is then pumped into bin 36 where it flows by gravity to rollers 18 and 20. However, saddle 36 can have other forms, including but not limited to of the construction of U.S. Pat. No. 5,752,364, which is hereby incorporated herein by reference.

Support material 16 typically is supplied from a roll 44 and after extending around the customary tension rollers 46 is threaded to extend under cross bar 38 of saddle 36 engaging roller 18, over the lands and grooves of the periphery of roller 18 located within bin 36 and mating side 32, and to extend between the nip of rollers 18 and 20 into exit side 34. Food 14 is initially located in mating side 32 intermediate support material 16 and second roller 20. In exit side 34, support material 16 is pulled typically by vacuum conveyors downstream from strip sheeter 12 to extend under periphery 28 of roller 20 within exit side 34 and then extend with a small amount of tension generally tangentially therefrom.

It can be appreciated that as food 14 and support material 16 is pulled between the abutment nip between rollers 18 and 20 by the rotation of rollers 18 and 20, food 14 and support material 16 advancing between rollers 18 and 20 will be compressed into the grooves such that food 14 will be deposited in continuous, spaced, parallel, narrow, thin strips upon support material 16, with the number, width and height of the strips of food 14 corresponding to the number, width and depth of the grooves and the spacing between the strips of food 14 corresponding to the width of the bands or lands between the grooves.

As food 14 is hot and may have a tackiness to stick or adhere to roller 20, a scraper 48 is provided to scrape food 14 which may adhere to roller 20. In the most preferred form, scraper 48 has a straight leading edge which flushly engages periphery 28 of roller 20. Scraper 48 is canted 15° to 30° from the horizontal and is arranged to engage roller 20 and extend generally tangentially therefrom at a position slightly past the lowermost point of roller 20 on the side opposite to roller 18. Scraper 48 in the preferred form is formed of hardened steel which is not susceptible to wear from the continuous engagement with roller 20, with roller 20 also being heated which may soften other materials resulting in wear. Scraper 48 further includes a thin anti-stick coating such as Teflon®. Thus, in operation, scraper 48 mechanically scrapes any food 14 off roller 20 which is then pushed onto scraper 48. Because of its non-wear characteristics, scraper 48 can be relatively thin to maximize removal of food 14 from and cleaning of roller 20. Further, due to its anti-stick coating, food 14 removed by scraper 48 will tend to fall by gravity when it travels upon scraper 48 and specifically does not tend to adhere or stick to scraper 48. If food 14 were to stick to scraper 48, food 14 would tend to bunch up and fall as the bunches grew to a size which would fall by gravity and not remain in strips on support material 16 as desired in the present invention.

It can be appreciated that support material 16 separates food 14 from roller 18 and should prevent food 14 from adhering thereto. However, if a problem should arise, such as food which could flow around the ends of support material 16 or through breaks or tears in support material 16, a suitable scraper can be provided for roller 18 also.

After strip sheeter 12, the sheet of support material 16 having strips of food 14 thereon is passed through a cooling tunnel 58. Cooling tunnel 58 is provided with forced chilled air typically cooled to an air temperature in the range of 32°–40° F. (0°–4° C.) and support material 16 and strips of food 14 remain in cooling tunnel 58 a sufficient time to cool from approximately 170° F. (77° C.) to 100° F. (38° C.). Support material 16 can be supported within cooling tunnel 58 on a stationary platform or on a moving platform such as a conveyor.

After cooling tunnel 58, support material 16 having strips of food 14 is passed onto a conveyor. The strips of food 14 can then be further processed at this time at optional stations such as by embossing or such as by coloration. Thereafter, support material 16 is cut between the strips of food 14 located thereon to form longitudinally extending, continuous, multiple strips of support material 16 and food 14 supported thereon. Then, each of the Ad multiple strips of support material 16 and food 14 supported thereon is cut to a finite length which in the preferred form is generally equal to 36 inches (1 meter), with each strip having a leading end and a trailing end. After cutting to the finite length, the strips of support material 16 and food 14 supported thereon are rolled into a rolled food item. Suitable provisions are made to prevent- the rolled food item from unrolling during fabrication such as in the wrapping and other packaging operations. In particular, such provisions could be the application of a label, the use of an edible adhesive such as corn syrup, or any other labelless method.

Figure 1:
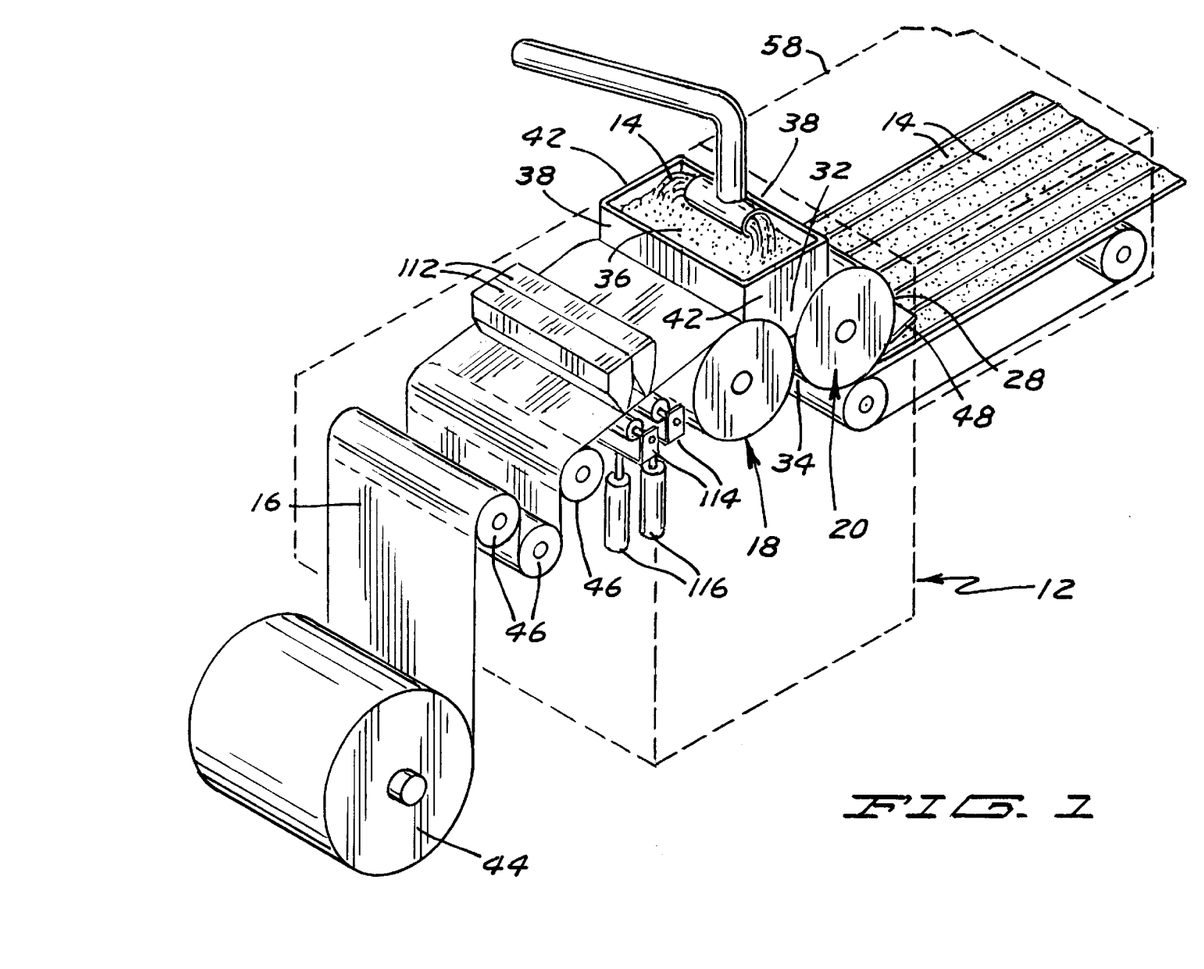
FIG. 1 shows a diagrammatic perspective view of an apparatus utilizing food fabrication methods according to the preferred teachings of the present invention.
Figure 6:
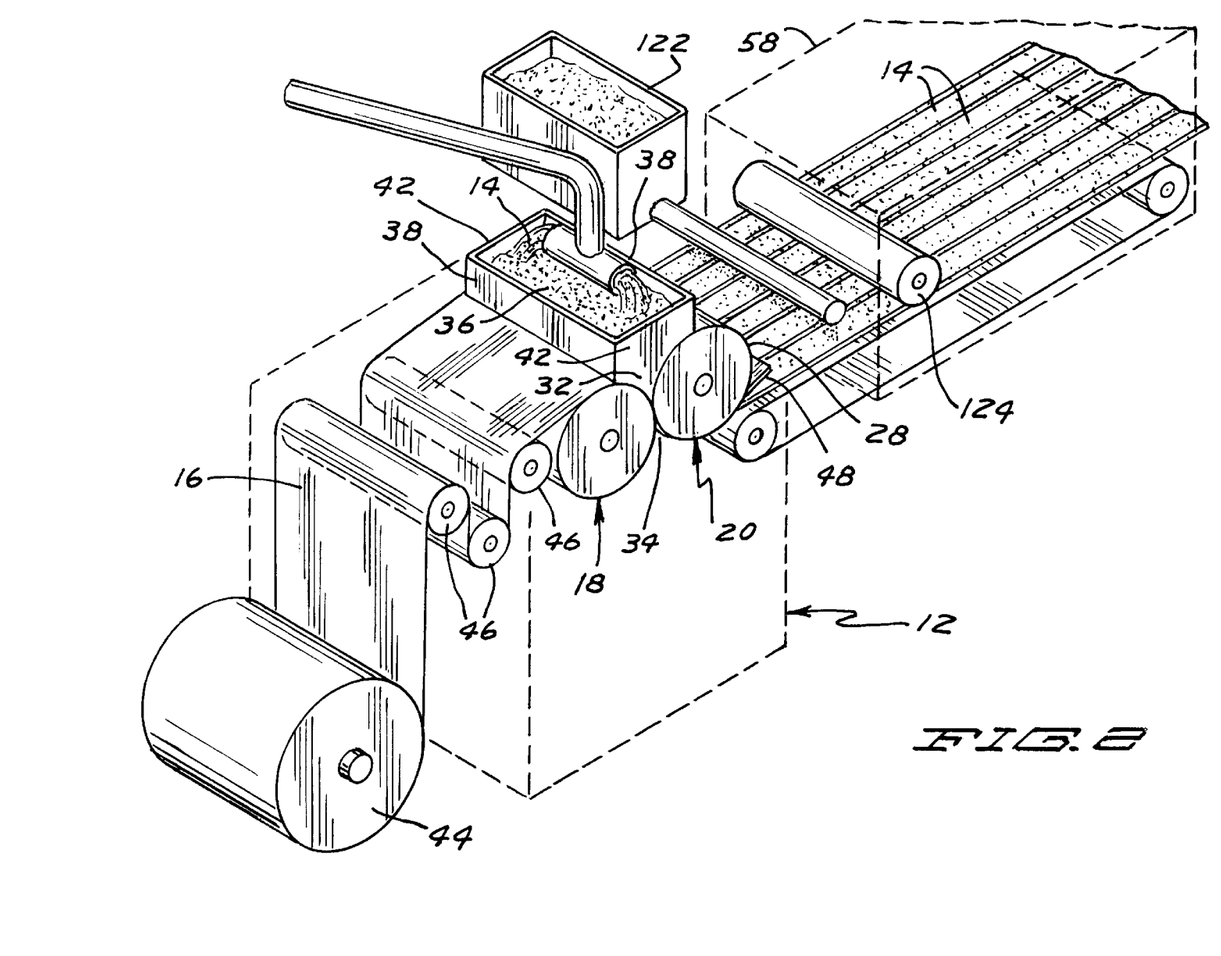

Apparatus 10 according to the teachings of the present invention includes suitable provisions for the topical application of heat sensitive ingredients and most preferably a flavoring for transfer to food 14 over time. In a preferred form as shown in FIG. 1, apparatus 10 includes first and second applicators 112 for applying first and second topical applications to support material 16 prior to its engagement with roller 18 of strip sheeter 12. In the most preferred form, applicators 112 apply topical applications in the form of a solution and are of the wiping type. In particular, applicators 112 are of a conventional design and specifically in actual practice are purchased from May Coating Technology of White Bear Lake, Minn., with modifications to correspond to the width of support material 16 and for mounting in apparatus 10. When applicators 112 are of the wiping type and to remove the possibility of carryover, applicators 112 and support material 16 are moved relative to each other such that applicators 112 are spaced from support material 16 when it is not desired to apply a topical application to support material 16. In the most preferred form, each applicator 112 has associated therewith a pusher bar 114 located on the opposite side of support material 16 than applicator 112 and which is movable toward and away from applicator 112 such as by an electrically actuated solenoid 116. In the form shown, pusher bar 114 is a roller which is pressed against support material 16. When moved toward applicator 112, pusher bar 114 engages with and deflects support material 16 to engage with applicator 112 such that topical application is wiped from applicator 112 and smeared onto support material 16. When moved away from applicator 112, pusher bar 114 does not deflect support material 16 sufficiently to engage with applicator 112 such that topical application will not be wiped from applicator 112 onto support material 16.

In the preferred form, neither of first and second applicators 112 provide a topical application to support material 16, or either one of the first and second applicators 112 or both first and second applicators 112 can provide topical application to support material 16. In the most preferred form, topical application is supplied to applicator 112 and simultaneously pusher bar 114 is moved by solenoid 116 toward support material 16 such that support material 16 engages with applicator 112 only when topical application is desired to be topically applied by that particular applicator 112.

According to the most preferred teachings of the present invention, first applicator 112 applies a first flavor which is different than the flavor of food 14 and than the second flavor which is applied by second applicator 112. In a preferred form, the first flavor is a fruit flavor including but not limited to lemon, cherry, and berry and in the most preferred form is an oil-in-water emulsion containing gum arabic and xantham as a thickener. Propylene glycol based flavors can also be used if the usage rate is low. The first flavor preferably is non-alcohol based. The first flavor has a viscosity preferably in the range of 100 to 1200 centipoise and has a usage rate in the range of 0.03–0.5% and preferably about 0.1% of food 14. Further, the first topical application can include a colorant having a color content of 0.0–6.0% pure dye and having a color different than the color of food 14 and preferably different than the color of the second topical application which is applied by second applicator 112. Furthermore, the first topical application can include other ingredients which are desired to be provided to food 14 separate from the formation and deposit of food 14 such as vitamins, minerals (calcium, iron, magnesium, etc.), and the like fortification ingredients.

In the most preferred form, second applicator 112 applies a second flavor which is different than the flavor of food 14 and than the first flavor which is applied by first applicator 112. In a preferred form, the second flavor is in the form of a solution including sodium citrate, citric acid, malic acid, or other food grade acidulants, gums, and acid resistant instant starches and other thickening agents. In the most preferred form, xanthan gum is utilized, and acids are utilized in an amount to reduce the pH preferably to 2.0. In the most preferred form, the second flavor has a viscosity in the range of 800 to 2200 centipoise and most preferably about 1300 centipoise and has a usage rate in the range of 0.1–2.0% of food 14. Further, the second topical application can include a colorant having a color content of 0.0–10.0% pure dye and having a color different than the color of food 14 and preferably different than the color of the first topical application which is applied by first applicator 112. Furthermore, the second topical application can include other ingredients which are desired to be provided to food 14 separate from the formation and deposit of food 14 such as vitamins, minerals (calcium, iron, magnesium, etc.), and the like fortification ingredients.

Now that the basic construction of apparatus 10 including applicators 112 has been explained, a preferred mode of operation of apparatus 10 according to the preferred teachings of the present invention can be set forth. In particular, initially in the production cycle, pusher bars 114 for both applicators 112 are moved away from support material 16 and flavor is not provided to either applicator 112. After support material 16 has been supplied just beyond the leading end, pusher bar 114 corresponding to second applicator 112 is moved towards applicator 112 to engage support material 16 with second applicator 112 and simultaneously the second flavor is supplied to second applicator 112 so that the first flavor is topically applied to support material 16. Prior to generally one third of the finite length from the leading edge, pusher bar 114 corresponding to first applicator 112 is moved towards applicator 112 to engage support material 16 with first applicator 112 and simultaneously the first flavor is supplied to first applicator 112 so that the second flavor is topically applied to support material 16. Just prior to one third of the finite length from the leading edge, pusher bar 114 corresponding to second applicator 112 is moved away from applicator 112 so that support material 16 does not engage second applicator 112 and supply of second flavor is interrupted to second applicator 112. It can be appreciated that a portion of support material 16 will be topically applied with both the first and second flavors, with the portion upstream being topically applied with only the second flavor and the portion downstream being topically applied with only the first flavor. After first applicator 112 has topically applied the first flavor for about an additional one third of the finite length and at about two thirds of the finite length, pusher bar 114 corresponding to first applicator 112 is moved away from applicator 112 so that support material 16 does not engage first applicator 112 and supply of the first flavor is interrupted to first applicator 112. It can then be appreciated that the portion of support material 16 downstream of the portion which was engaged by first applicator 112 as well as the portion of support material upstream of the portion which was engaged by applicator 112 is not topically applied with flavor.

It can be appreciated that due to the viscosity of the topical applications, the flavors do not have a tendency to be absorbed into support material 16 but rather have a tendency to bead up and/or be carried by support material 16. As very little mixing of food 14 occurs in upper, mating side 32 of saddle 36, flavors topically applied on support material 16 do not have a tendency to mix with food 14 in upper mating side 32 of saddle 36 before it passes to exit side 34 but rather tend to remain on support material 16 and are sandwiched against support material 16 by food 14 after passing through exit side 34. Thereafter, support material 16 and food 14 supported thereon can be further processed by apparatus 10. Over time, the flavor sandwiched between support material 16 and food 14 will be absorbed or otherwise transferred into food 14. Similarly, the flavor located on support material 16 but intermediate strips of food 14 will tend to be absorbed into food 14, can be lost during fabrication, or can remain as residue on support material 16.

Although food 14 of a single flavor is continuously supplied to saddle 36 and continuously fabricated on support material 16, food 14 in the rolled food item according to the preferred teachings of the present invention will have portions of different flavors as the result of the topical application of flavors at desired portions by applicators 112. Specifically in the preferred form disclosed, as the trailing edge is unrolled from the roll and food is removed from support material 16, food 14 will have a flavor corresponding to the flavor of food 14 entering saddle 36 for approximately the first third of the finite length. Then in the second portion, food 14 will have a flavor corresponding to the first flavor dispensed by first applicator 112 (in combination with the flavor of food 14 entering saddle 36) for approximately the next third of the finite length. A small transition portion is located between the first and second portions due to transfer of flavor upstream in food 14 from its application and due to the ramp up of the application rate at initiation of operation of first applicator 112. Generally, the last third of the finite length, food 14 will have a flavor corresponding to the second flavor dispensed by second dispenser 112 (in combination with the flavor of food 14 entering saddle 36) for the third portion. A small transition portion is located between the second and third portions due to the simultaneous application of the first and second flavors, due to the transfer of the first flavor downstream and of the second flavor upstream, and the ramp up and down of the application rates of second applicator 112 at initiation and of first applicator 112 at stopping of operation, respectively. A small transition portion is located downstream of the third portion due to the transfer of the second flavor downstream and the ramp down of the application rate of second applicator 112 at stopping of operation and to insure that the second flavor is not carried over or transferred to the next finite length beyond the trailing end.

It can be appreciated that topical applications can be provided by applicators 112 in other patterns in the production cycle than as described. As an example, although topical applications are applied once by each applicator 112 for about one third of the finite length in a production cycle, topical applications could be applied twice by each applicator 112 for about one sixth of the finite length each time in a production cycle.

In an alternate form as shown in FIG. 2, apparatus 10 includes at least a first applicator or dispenser 122 for providing a topical application to food 14 after being deposited on support material 16 by strip sheeter 12 and preferably prior to cooling tunnel 58. In the most preferred form, dispenser 122 provides a topical application in the form of a dry powder and is of the metering, drop type. In the most preferred form, the dry powder is of a size to pass through a one twentieth of an inch (1.27 mm) mesh. As food 14 is hot, food 14 has a tackiness so that the topical application in the form of a dry powder will tend to stick or adhere to food 14. However, to insure that the topical application in the form of a dry powder is suitably secured to food 14, apparatus 10 in the most preferred form includes a pinch roller 124 positioned downstream of dispenser 122 for smashing the topical application in the form of a dry powder into food 14 but generally without flattening food 14 below its desired height.

In the most preferred form, the topical application dispensed by dispenser 122 is a flavor such as a fruit flavor including but not limited to lemon, punch, cherry, or the like dried on a substrate such as gelatin or sugar by encapsulation, spray drying, or the like. Further, the topical application can include a colorant in final dry form and which can be dry blended with the flavor. Furthermore, the topical application can include other ingredients which are desired to be provided to food 14 separate from the formation and deposit of food 14 such as vitamins, minerals (calcium, iron magnesium, etc.), and the like fortification ingredients. In this regard, it is especially desirable to topically apply temperature sensitive ingredients such as but not limited to vitamins A and C and sweeteners such as aspartine utilizing dispenser 122 when food 14 is at a reduced temperature from when it is formulated and/or initially deposited upon support material 16.

Now that the basic construction of apparatus 10 including dispenser 122 has been explained, preferred modes of operation of apparatus 10 according to the teachings of the present invention can be set forth. In particular, initially in the production cycle, dispenser 122 is operated just after the leading edge so that flavor is topically applied to food 14 (and smashed therein by roller 124) for slightly less than one half of the finite length from the leading edge. Thereafter, dispenser 122 is not operated so that flavor is not dispensed for approximately one half of the finite length. It can then be appreciated that the portions of the strips of food 14 upstream and downstream of the portion in which the flavor is topically applied by dispenser 122 and is smashed into food 14 is not topically coated by flavor. In the most preferred form, dispenser 122 broadcasts the flavor over the entire width of support material 16, with any flavor which is located between the strips of food 14 and which is not smashed into or otherwise secured to food 14 can be lost during fabrication or may be captured for reuse.

In the most preferred form, the flavor smashed into food 14 will dissolve or otherwise be absorbed into food 14. However, if desired, flavor smashed into food 14 can retain its separate integrity in food 14 if consistency is not desired throughout food 14.

Multiple topical applications can be provided by including multiple dispensers 122 each supplying a separate topical application in a similar manner as applicators 112. However, as carryover is not a major concern when topical applications in the form of a dry powder are being applied, topical applications from different sources can be supplied in a desired manner to a single dispenser 122 for immediate application to food 14.

Although food 14 of a single flavor is continuously supplied to saddle 36 and continuously fabricated on support material 16, food 14 in the rolled food item according to the teachings of the present invention will have portions of different characteristics as the result of the topical application at desired portions by dispenser 122. In particular and in the most preferred form, the flavor of food 14 as it is unrolled from the roll will change according to the whether or not a flavor has been topically applied and the type and rate at which the flavor has been topically applied.

Now that the basic teachings of the present invention have been explained, many extensions and variations will be obvious to one having ordinary skill in the art. For example, although the methods for fabricating a food item have been disclosed for the fabrication of a food item of a relatively narrow width and an elongated length, the methods according to the teachings of the present application could have application to the fabrication of other food items. Particularly, although in the preferred form strips of food 14 are deposited on support material 16 which is later cut into multiple strips, food 14 could be deposited on support material 16 in the form of strips. Similarly, although food 14 is deposited on support material 16 in the desired shape in the preferred form by passing between rollers 18 and 20, the food item could be deposited in other manners according to the preferred teachings of the present invention such as but not limited to placing food 14 upon support material 16 and then shaping food 14 on support material 16 to the desired shape such as by pressing under a press roller.

Further, the methods according to the teachings of the present invention could be utilized in the production of food items having generally the same width and length such as FRUIT ROLL-UPS™ fruit products.

Similarly, the methods according to the teachings of the present invention could be utilized in the production of fruit-based snack products of the type disclosed in U.S. Pat. Nos. 5,752,364; 5,755,077; or 5,846,588, each of which are incorporated herein by reference. In this regard, applicators 112 could topically apply the flavors to a film material against which food 14 is deposited and utilized to support and remove food material from the grooves of forming roller 18 rather than to support material 16 extending over roller 20 as shown in FIG. 1. In this regard, transfer of the topical applications from the film material to food 14 must occur prior to its removal from food 14 and support material 16.

Likewise, although applicators 112 are shown and described in the preferred form as being of the wiping type, applicators 112 can be of other forms according to the teachings of the present invention. For example, applicators 112 could be of the rolling type. In this regard, rolling type applicators 112 may have particular advantages in applying topical applications at different segments of their periphery without relative movement of applicators 112 and support material 16 during topical application along desired portions of support material 16. Also, rolling type applicators 112 would have advantages of applying flavor and similar topical applications to support material 16 in patterns which are not necessary linear in the direction of movement of support material 16. Specifically, rolling type applicators 112 according to the teachings of the present invention would have the ability to apply topical applications in a printing like manner.

Furthermore, applicators 112 can be located at any desired position upstream of strip sheeter 12. In this regard, applicators 112 can be positioned such that applicators 112 are just upstream of strip sheeter 12 so that parts of the finite length are positioned inside strip sheeter 12 while applicators 112 are topically applying other parts of the finite length. On the other hand, applicators 112 can be positioned considerably upstream of strip sheeter 12 so that the topical application can dry or partially dry upon support material 16 before reaching strip sheeter 12. In this regard, provisions such as heaters, fans, or the like can be provided to enhance drying of the topical application on support material 16.

Likewise, although in the forms discussed applicators 112 and 122 are described as intermittently providing a topical application such as to provide portions of differing flavors in one preferred form, it can be appreciated that applicators 112 and 122 can continuously provide a topical application if desired according to the teachings of the present invention. As an example, it would be especially desirable to apply vitamins, minerals, and like fortification ingredients for the entire area of food 14.

Furthermore, although shown as alternate embodiments, applicators 112 and 122 can both be utilized in apparatus 10 according to the teachings of the present invention. As an example, applicators 112 could be utilized to topically apply a colorant and/or a flavor while applicator 122 could be utilized to topically apply fortification ingredients.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Method of applying a topical application to a food comprising: providing a continuous support material; depositing a food on the continuous support material, with the food being separable from the support material for consumption, with the food having an original flavor, with the food deposited on the continuous support material having a shape and an area; and providing at least a first topical application for contact by the food in a first portion of the area of the food, with the at least first topical application being in the form of a first flavor which is different than the original flavor, with the at least first topical application being transferred to the food such that the resulting flavor of the food in the first portion is the combination of the original flavor of the food and the flavor of the at least first topical application.

2. The method of claim 1, wherein providing the topical application comprises providing the topical application on the food after the food of the shape is deposited on the continuous support material.

3. The method of claim 2 wherein providing the topical application comprises providing the topical application in the form of a dry powder.

4. The method of claim 3 wherein providing the topical application comprises providing a dispenser for dispensing the dry powder on the food.

5. The method of claim 3 wherein providing the topical application further comprises smashing the dry powder into the food.

6. The method of claim 5 wherein smashing the dry powder comprises providing a roller for rolling on the area of the food deposited on the continuous support material.

7. Food item fabricated by the method of claim 1.

8. The method of claim 1 wherein providing the topical application comprises providing the topical application on the continuous support material before the food is deposited on the continuous support material.

9. The method of claim 8 wherein providing the topical application comprises providing the topical application in the form of an emulsion.

10. The method of claim 8 wherein providing the topical application comprises: providing an applicator of the wiping type; and providing the topical application to the applicator for smearing onto the continuous support material.

11. The method of claim 10 wherein providing the continuous support material comprises supplying the continuous support material from a roll; wherein the applicator is spaced from the continuous support material; and wherein providing the topical application includes deflecting the continuous support material to engage the applicator.

12. The method of claim 11 wherein deflecting the continuous support material comprises: providing a pusher bar on the opposite side of the continuous support material than the applicator; and moving the pusher bar toward and away from the applicator, with the continuous support material engaging the applicator when the pusher bar is moved toward the applicator and not engaging the applicator when the pusher bar is moved away from the applicator.

13. The method of claim 1 wherein depositing the food on the continuous support material comprises pulling the food and continuous support material between an abutment nip between first and second rollers rotating in opposite rotational directions.

14. The method of claim 13 wherein providing the topical application comprises providing the topical application on the continuous support material before the food is deposited on the continuous support material.

15. The food item of claim 14 wherein the first topical application is in the form of solution.

16. The method of claim 13 wherein providing the topical application comprises providing the topical application on the food after the food is deposited on the continuous support material.

17. The method of claim 16 wherein providing the topical application comprises providing the topical application in the form of a dry powder.

18. The method of claim 1 wherein depositing the food on the continuous support material comprises depositing the food at elevated temperatures on the continuous support material.

19. The method of claim 1 wherein providing the topical application comprises providing at least the first topical application in the form of temperature-sensitive ingredients.

20. The method of claim 1 wherein depositing the food on the continuous support material comprises depositing the food continuously on the continuous support material.

21. The method of claim 1 wherein depositing the food on the continuous support material comprises depositing a sweetened dehydrated fruit-based material on the continuous support material.

22. The method of claim 21 wherein providing the topical application comprises providing the topical application on the food after the food of the shape is deposited on the continuous support material.

23. The method of claim 22 wherein providing the topical application comprises providing the topical application in the form of a dry powder.

24. The method of claim 21 wherein providing the topical application comprises providing the topical application on the continuous support material before the food is deposited on the continuous support material.

25. The method of claim 24 wherein the first topical application is in the form of a solution.

26. The method of claim 24 wherein providing the topical application comprises: providing an applicator of the wiping type; and providing the topical application to the applicator for smearing onto the continuous support material.

27. The method of claim 1 wherein providing the topical application comprises providing the topical application in the form of a solution.

28. The method of claim 1 wherein providing the topical application comprises intermittently providing the topical application.

29. The method of claim 1 wherein depositing the food on the continuous support material comprises depositing the food as a strip of a thinness requiring external support on the continuous support material.

30. The method of claim 1 wherein providing the first topical application comprises providing the first topical application including a fortification ingredient.

31. The method of claim 30 wherein providing the first topical application comprises providing the first topical application including calcium.

32. The method of claim 1 wherein providing the first topical application comprises providing the first topical application having a color different than the color of the food.

33. Method of applying topical applications to a food comprising: providing a support material; depositing a food on the support material, with the food being separable from the support material for consumption, with the food having an original flavor, with the food deposited on the support material having a shape and an area; providing a first topical application for contact by the food in a first portion of the area of the food, with the first topical application being in the form of a first flavor which is different than the original flavor, with the first topical application being transferred to the food such that the resulting flavor of the food in the first portion is the combination of the original flavor of the food and the flavor of the first topical application; and providing a second topical application for contact by the food in a second portion of the area of the food, with the second topical application being in the form of a second flavor which is different than the original flavor and than the first flavor.

34. The method of claim 33 wherein the first and second portions are of a size less than the area, with the first and second portions overlapping on the area.

35. The method of claim 34 wherein the first and second portions include differing parts of the area.

36. The method of claim 35 wherein the area includes a third portion which does not overlap with the first and second portions and which is free of the topical application.

37. The method of claim 33 wherein providing the topical application comprises providing the topical application on the support material before the food is deposited on the support material.

38. The method of claim 37 wherein providing the topical application comprises providing the topical application in the form of an emulsion.

39. The method of claim 38 wherein providing the topical application comprises: providing an applicator of the wiping type; and providing the emulsion to the applicator for smearing onto the support material.

40. The method of claim 39 wherein providing the support material comprises supplying the support material from a roll; wherein the applicator is spaced from the support material; and wherein providing the topical application includes deflecting the support material to engage the applicator.

41. The method of claim 40 wherein deflecting the support material comprises: providing a pusher bar on the opposite side of the support material than the applicator; and moving the pusher bar toward and away from the applicator, with the support material engaging the applicator when the pusher bar is moved toward the applicator and not engaging the applicator when the pusher bar is moved away from the applicator.

42. The method of claim 37 wherein providing the support material comprises providing the support material for supporting the food to form a food item.

43. The method of claim 42 wherein providing the support material comprises providing the support material in the form of a paper.

44. The method of claim 43 wherein providing the support material comprises providing the support material without bulkiness to allow rolling of food and support material into a coil in the food item.

45. The food item fabricated by the method of claim 33.

46. The method of claim 33 wherein providing the first topical application comprises providing the first topical application including a fortification ingredient.

47. The method of claim 46 wherein providing the first topical application comprises providing the first topical application including calcium.

48. The method of claim 33 wherein providing the first topical application comprises providing the first topical application having a color different than the color of the food.

49. Food item comprising, in combination: a support material; a food deposited on the support material, with the food being separable from the support material for consumption, with the food having an original flavor, with the food deposited on the support material having a shape and an area; and a first topical application contacting the food in a first portion of the area of the food, with the first topical application being in the form of a first flavor which is different than the original flavor, with the first topical application being transferred to the food such that the resulting flavor of the food in the first portion is the combination of the original flavor of the food and the flavor of the first topical application.

50. The food item of claim 49 wherein the food is deposited continuously on the support material.

51. The food item of claim 50 wherein the food is deposited as a strip on the support material.

52. The food item of claim 51 wherein the strip has a thinness requiring external support.

53. The food item of claim 52 wherein the support material is formed of material allowing rolling of the support material and of the food deposited thereon without bulkiness.

54. The food item of claim 53 wherein the support material is formed of silicon parchment paper.

55. The food item of claim 52 wherein the support material is formed of coated paperboard.

56. The food item of claim 49 wherein the support material is formed of nonedible material.

57. The food item of claim 49 further comprising, in combination: a second topical application contacting the food in a second portion of the area of the food, with the second topical application being transferred to the food.

58. The food item of claim 57 wherein the second topical application is in the form of a second flavor which is different than the original flavor and than the first flavor.

59. The food item of claim 58 wherein the first and second portions are of a size less than the area.

60. The food item of claim 59 wherein the first and second portions include differing parts of the area.

61. The food item of claim 60 wherein the first and second portions overlap on the area.

62. The food item of claim 60 wherein the area includes a third portion which does not overlap with the first and second portions.

63. The food item of claim 57 wherein the second topical application is a fortification ingredient.

64. The food item of claim 63 wherein the fortification ingredient is calcium.

65. The food item of claim 57 wherein the second topical application has a color different than the color of the food and of the first topical application.

66. The food item of claim 49 wherein the first topical application is in the form of a solution.

67. The food item of claim 66 wherein the first topical application is in the form of an emulsion.

68. The food item of claim 49 wherein the first topical application is in the form of a dry powder.

69. The food item of claim 68 wherein the first topical application contacts the food on the opposite side than the support material.

70. The food item of claim 69 wherein the first topical application is smashed into the food.

* * * * *